United States Patent
Young et al.

(10) Patent No.: US 8,206,220 B2
(45) Date of Patent: Jun. 26, 2012

(54) VIDEO GAME CONTROLLER

(75) Inventors: Andrew Brian Young, Gwent (GB); Robert Ian Hall, Bristol (GB); Stephen Thomas Bright, Monmouthshire (GB)

(73) Assignee: Mad Catz Europe Limited (GB)

( * ) Notice: Subject to any disclaimer, the term of this patent is extended or adjusted under 35 U.S.C. 154(b) by 453 days.

(21) Appl. No.: 12/123,800

(22) Filed: May 20, 2008

(65) Prior Publication Data

US 2008/0311992 A1 Dec. 18, 2008

(30) Foreign Application Priority Data

Jun. 12, 2007 (GB) .................................. 0711355.8

(51) Int. Cl.
*A63F 13/00* (2006.01)
*A63F 13/02* (2006.01)
(52) U.S. Cl. ..................... 463/37; 463/38; 273/148 B
(58) Field of Classification Search ............. 463/36–38; 345/161; 273/148 B
See application file for complete search history.

(56) References Cited

U.S. PATENT DOCUMENTS

| | | | | |
|---|---|---|---|---|
| 5,615,083 A | * | 3/1997 | Burnett | 361/679.1 |
| 5,645,277 A | * | 7/1997 | Cheng | 273/148 B |
| 5,865,546 A | * | 2/1999 | Ganthier et al. | 400/489 |
| 6,163,326 A | * | 12/2000 | Klein et al. | 345/156 |
| 6,727,890 B2 | * | 4/2004 | Andres et al. | 345/168 |
| 6,903,662 B2 | * | 6/2005 | Rix et al. | 341/22 |
| 2005/0255915 A1 | * | 11/2005 | Riggs et al. | 463/37 |
| 2008/0284731 A1 | * | 11/2008 | Mak Pui See et al. | 345/161 |

* cited by examiner

*Primary Examiner* — Dmitry Suhol
*Assistant Examiner* — Alex F. R. P. Rada, II
(74) *Attorney, Agent, or Firm* — Durham Jones & Pinegar Intellectual Property Law Group

(57) ABSTRACT

A game controller comprising: a hand-held base unit comprising one or more base unit actuators, each configured to generate a respective actuation signal in response to user input; and a module comprising two or more module actuators, each configured to generate a respective actuation signal in response to user input. The module is mounted to the base unit and can be rotated horizontally between two or more orientations to adjust the configuration of the module actuators relative to the base unit actuator(s).

20 Claims, 6 Drawing Sheets

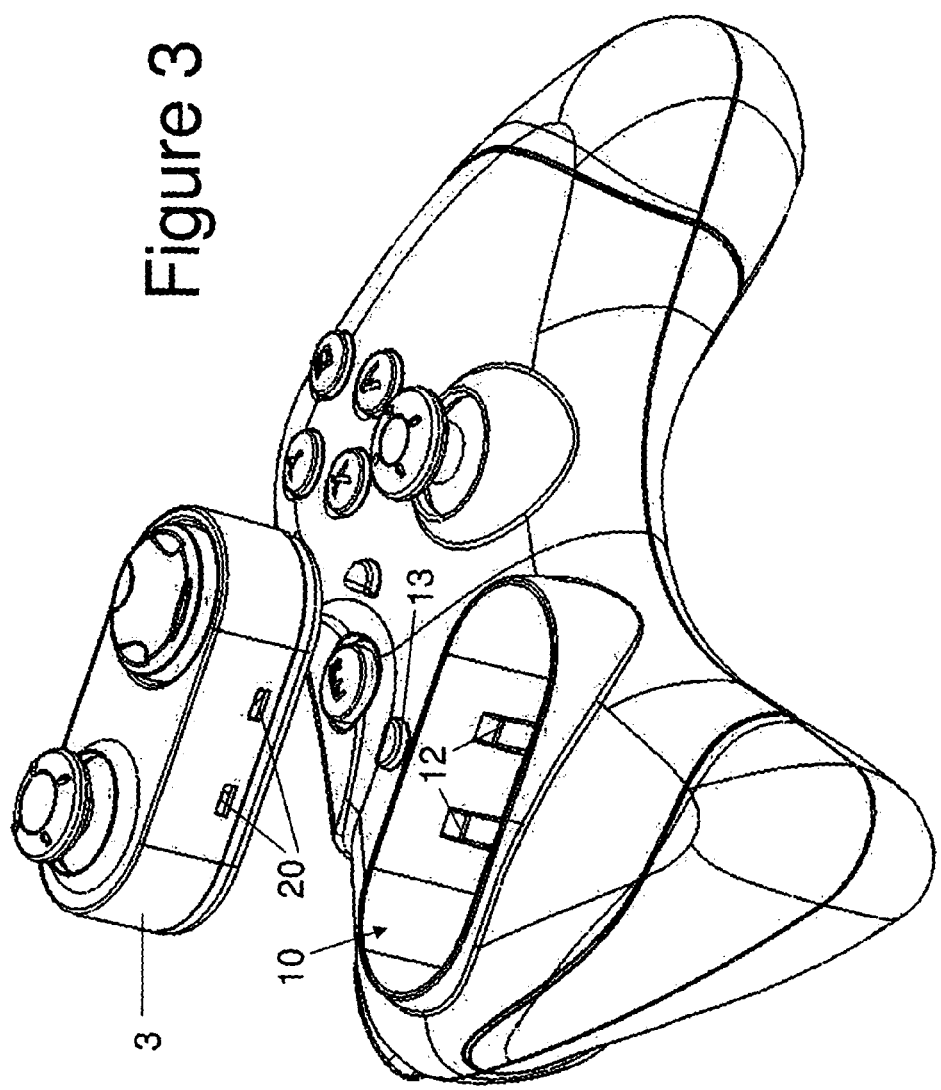

VIDEO GAME CONTROLLER

CROSS REFERENCE TO RELATED APPLICATIONS

This application claims priority United Kingdom Patent Application No. 0711355.8, filed on Jun. 12, 2007, the contents of which are incorporated by reference.

FIELD OF THE INVENTION

The present invention relates to a hand-held video game controller.

BACKGROUND OF THE INVENTION

Hand-held controllers are commonly used to provide user input to a video game running on a game processor such as an IBM PC™, Sony Playstation™ or Microsoft Xbox™.

Such controllers commonly include a pair of directional controllers, each operated by a respective thumb. In a conventional Xbox™ gamepad, the left thumb can either operate a directional pad (conventionally known as a D-pad) at a front-center position, or an analog stick at a rear-left position. The opposite configuration is commonly used in a conventional Playstation™ gamepad. That is, the analog stick is at the front-center position, and the D-pad is at the rear-left position.

SUMMARY OF THE INVENTION

The present invention provides a video game controller comprising:
  a hand-held base unit comprising one or more base unit actuators, each configured to generate a respective actuation signal in response to user input; and
  a module comprising two or more module actuators, each configured to generate a respective actuation signal in response to user input;
wherein the module is mounted to the base unit and can be rotated between two or more orientations to adjust the configuration of the module actuators relative to the base unit actuator(s), and wherein all of the module actuators are accessible to a user in each orientation of the module.

A further aspect of the invention provides a video game controller comprising:
  a hand-held base unit comprising one or more base unit actuators, each configured to generate a respective actuation signal in response to user input; and
  a module comprising two or more module actuators, each configured to generate a respective actuation signal in response to user input;
wherein the module is mounted to the base unit and can be rotated horizontally between two or more orientations to adjust the configuration of the module actuators relative to the base unit actuator(s).

A further aspect of the invention provides a method of operating a video game controller, the controller comprising a hand-held base unit comprising one or more base unit actuators, each configured to generate a respective actuation signal in response to user input; and a module comprising two or more module actuators, each configured to generate a respective actuation signal in response to user input, the method comprising:

mounting the module on the base unit in a first orientation;
  generating actuation signals with at least one of the base unit actuators and at least two of the module actuators with the module in the first orientation;
  rotating the module into a second orientation; and
  generating actuation signals with at least one of the base unit actuators and at least two of the module actuators with the module in the second orientation.

The invention enables the module actuators to be adjusted into a configuration which suits a particular user.

Typically the module or the base unit comprises two or more connectors, each of which forms a first half of a signal interface between the module and the base unit when the module is in a particular orientation. The signal interface may be a contact-less interface in which the signals are transmitted over an air interface—but more preferably the connectors comprise electrical plugs or sockets.

In the preferred embodiment described below, the multiple connectors are on the base unit. This arrangement is preferred since it enables the orientation of the module to be easily sensed by determining the presence of a signal at one or other of the connectors. However it will be appreciated that the arrangement may be reversed: that is with the multiple connectors on the module instead of the base unit.

In the preferred embodiment described below the base unit actuators are carried by the base unit in a fixed position. However, the invention also extends to cover a video game controller in which the base unit actuators are not fixed to the base unit. For instance the base unit actuators may be carried by a second module which is mounted to the base unit and can be rotated between two or more orientations to adjust the configuration of the base unit actuators relative to the base unit.

BRIEF DESCRIPTION OF THE DRAWINGS

Embodiments of the invention will now be described with reference to the accompanying drawings, in which:

FIG. 3 shows the module being removed from the base unit;

DETAILED DESCRIPTION OF EMBODIMENT(S)

Figure 1:
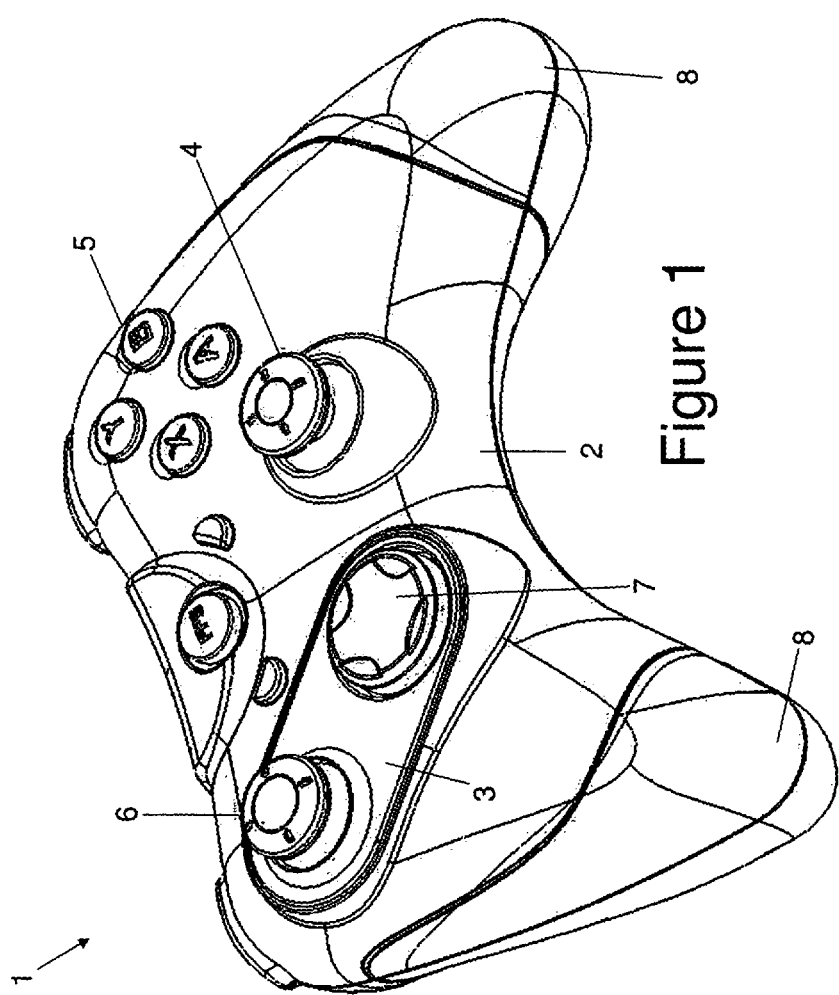
FIG. 1 is a perspective view of a gamepad with the module in an Xbox™ configuration.

A gamepad 1 shown in FIG. 1 comprises a base unit 2 and a module 3 mounted to the base unit. The base unit carries an analog stick 4 and a set of four action buttons 5. The module 3 carries an analog stick 6 and a directional pad 7 (conventionally known as a D-pad).

The gamepad 1 provides user input to a video game running on a game processor (not shown). The game processor may comprise a dedicated video game console such as a Sony Playstation™ or Microsoft Xbox™, or a more generic computing device such as an IBM PC™ or laptop.

The analog sticks 4, 6 and D-pad 7 act as direction controllers: that is, actuation signals generated in response to user input by the analog sticks 4, 6 and D-pad 7 are generally used to control direction in the video game, such as the direction of movement of a person in a first-person shooting game. The actuation signals generated in response to user input by the action buttons 5 generally prompt an action in the video game, such as the firing of a shot in a first-person shooting game.

The base unit 2 has a pair of hand grips 8 extending from its front, and a wire (also not shown) connecting the gamepad to the game processor extends from the rear of the base unit.

The analog stick 6 and D-pad 7 are arranged in the orientation shown in FIG. 1; that is, with the D-pad 7 at the front-center position, and the analog stick 6 at the rear-left position. In this orientation the D-pad 7 is symmetrically opposite the analog stick 4, enabling the D-pad 7 to be operated by the left thumb and the analog stick 4 to be operated by the right thumb. This configuration is commonly used in a conventional Xbox™ gamepad.

Figure 2:
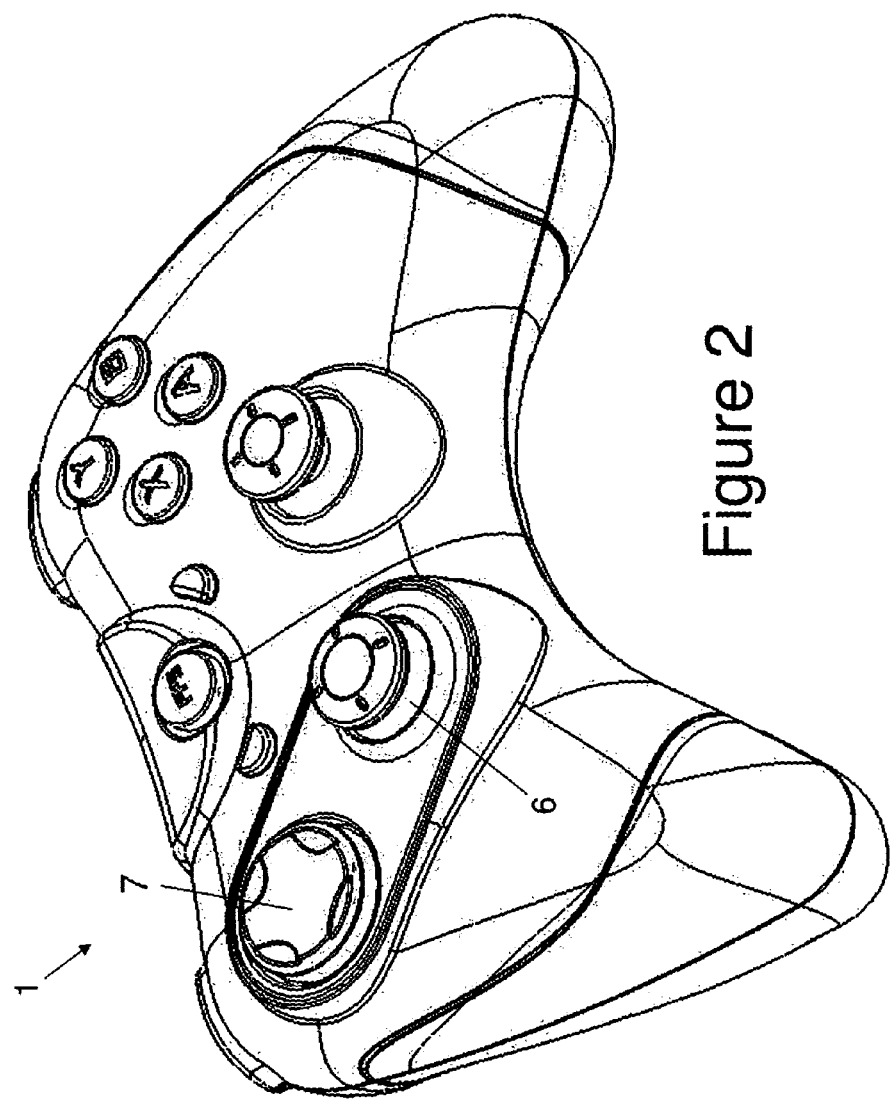
FIG. 2 is a perspective view of the gamepad with the module in a Playstation™ configuration.

The module 3 can be rotated between the orientation shown in FIG. 1 to the orientation shown in FIG. 2, in which the analog stick 6 is at the front-center position. This configuration is commonly used in a conventional Playstation™ gamepad. Note that both the analog stick 6 and D-pad 7 are accessible to a user, whether the module is in the FIG. 1 orientation or the FIG. 2 orientation. The rotation of the module is in the same plane as the base unit—i.e. horizontal if the base unit is being held horizontally.

Figure 5:
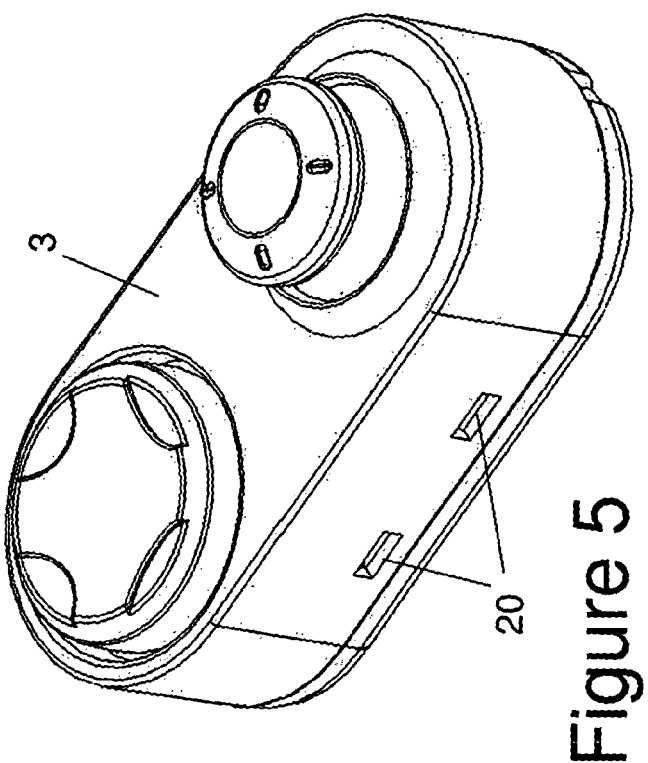
FIG. 5 is a perspective view of the top of the module.
Figure 6:
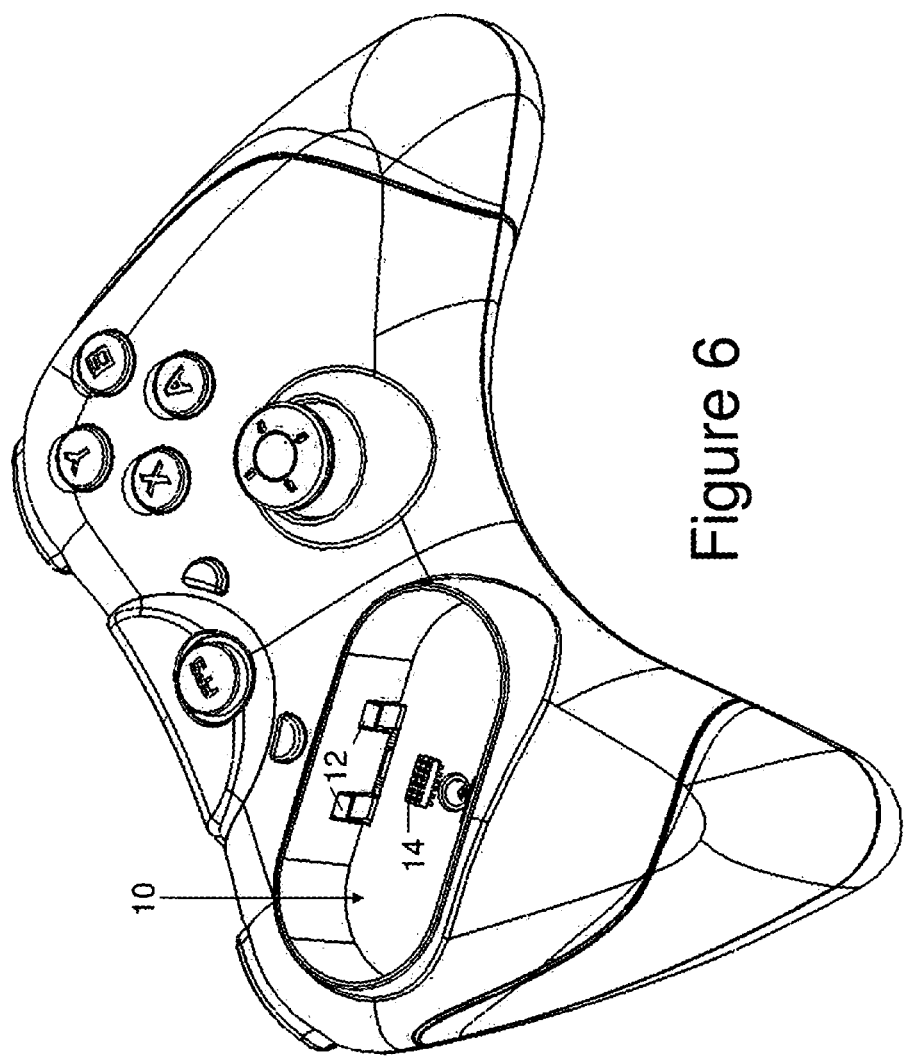
FIG. 6 is a perspective view of the base unit with the module removed.
Figure 7:
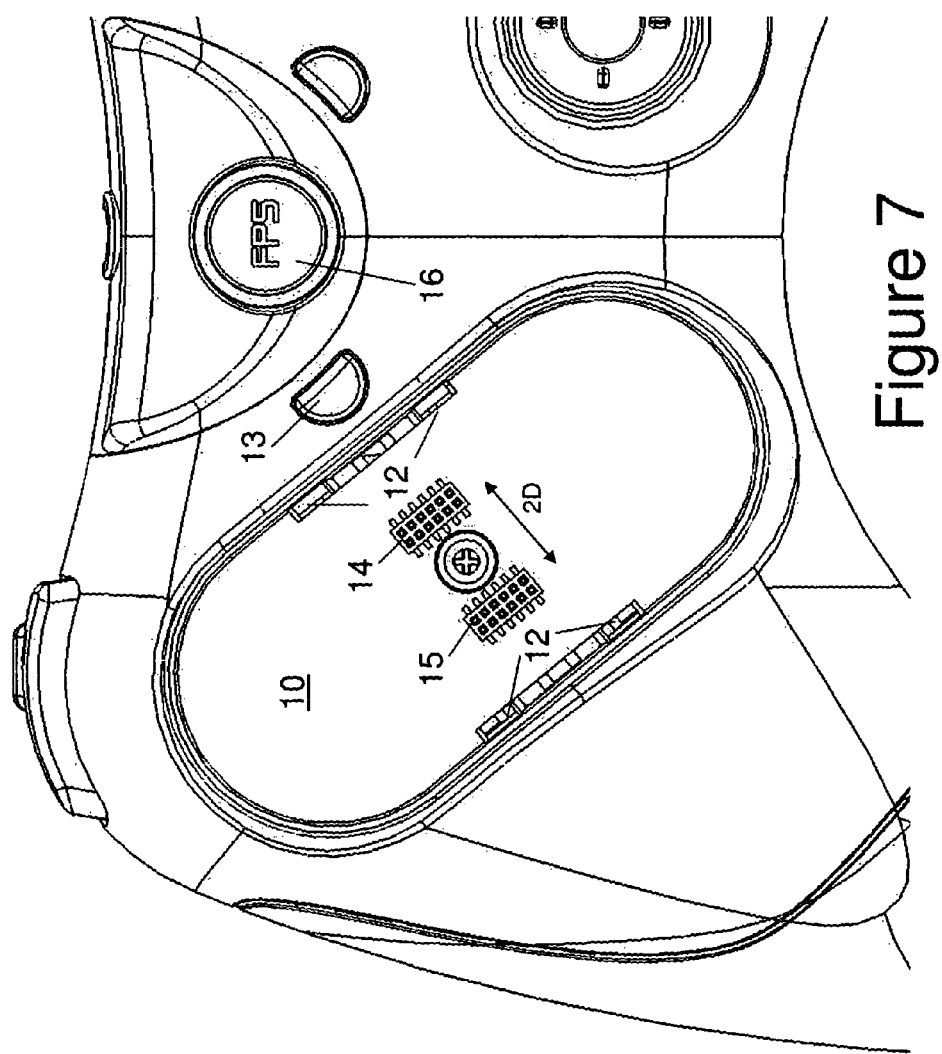
FIG. 7 is an enlarged plan view of the recess in the base unit.

The module 3 is housed in a recess 10 in the upper face of the base unit, shown in FIGS. 3, 6 and 7. Two pairs of spring loaded latches 12 are provided at the base of the recess. The latches 12 engage with recesses 20 on each side of the module 3, shown in FIGS. 4 and 5. A button 13 can be pressed to disengage the latches 12 and eject the module from the recess as shown in FIG. 3.

Figure 4:
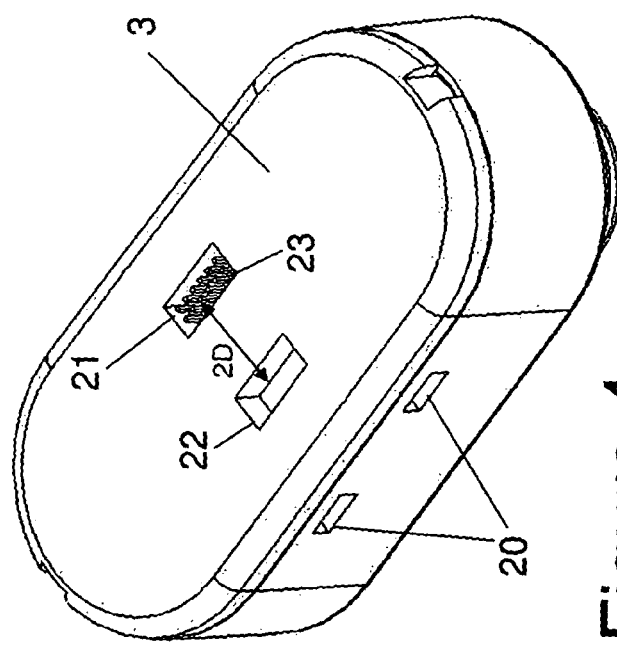
FIG. 4 is a perspective view of the underside of the module.

The base of the module, shown in FIG. 4, has a pair of recesses 21, 22 which are offset from the center of the module by an equal distance D. Therefore the distance between the centers of the recesses 21, 22 is 2D as illustrated in FIG. 4. A set of eight electrical pins 23 projects from the base of the recess 21. This set of pins 23 carries actuation signals from both the analog stick 6 and the D-pad 7. The base of the recess 10 in the base unit has two plugs 14, 15 shown in FIG. 7, each carrying a set of eight electrical sockets, which are each offset from the center of the recess by the distance D. The plugs 14, 15 slide into the module recesses 21, 22 when the module is fitted to the base unit.

Each plug 14, 15 forms a first half of a signal interface which couples the module to the base unit when the module is in a particular orientation. That is, when the module 3 is in the orientation of FIG. 1 the pins 23 are inserted into the sockets carried by the plug 14, and when the module 3 is in the orientation of FIG. 2 the pins 23 are inserted into the sockets carried by the other plug 15.

The plugs 14, 15 each have respective output lines (not shown) which lead to a processor (not shown) in the base unit. The processor senses the orientation of the module by determining the presence of a signal on one or other of the output lines. The processor also acts as an interface between the video game and the various actuators on the game pad. An indication light 16 is illuminated a first colour when the module 3 is in the configuration of FIG. 1, and a second colour when the module 3 is in the configuration of FIG. 2.

Although the invention has been described above with reference to one or more preferred embodiments, it will be appreciated that various changes or modifications may be made without departing from the scope of the invention as defined in the appended claims.

The invention claimed is:

1. A video game controller comprising:
   a hand-held base unit including:
   at least one base unit actuator, each base unit actuator configured to generate a respective actuation signal in response to user input;
   at least one module-receiving feature defining an opening; and
   at least two first electrical connectors cooperating with the at least one module-receiving feature and the opening defined thereby;
   a module removably disposed relative to the opening defined by the module-receiving feature of the hand-held base unit and comprising:
   a single body; and
   two or more module actuators collectively carried by the single body, each module actuator configured to generate a respective actuation signal in response to user input; and
   at least two second electrical connectors collectively carried by the single body, each of the at least two second electrical connectors corresponding to a particular one of the two or more module activators,
   the single body of the module being configured to be coupled to the at least one module-receiving feature of the hand-held base unit, and at least partially within the opening, in two or more orientations relative to the hand-held base unit, each orientation of the single body of the module positioning the two or more module actuators relative to the at least one base unit actuator in a different configuration than each other orientation of the module relative to the hand-held base unit, each of the two or more module actuators being accessible to a user in each orientation of the module relative to the hand-held base unit, wherein in a first orientation, each of the at least two first electrical connectors connects to a respective one of the at least two second electrical connectors, and in a second orientation, each of the at least two first electrical connectors connects to a different one of the at least two electrical connectors.

2. The controller of claim 1, wherein the module or the hand-held base unit includes two or more first electrical connectors, each of the two or more first electrical connectors being configured to couple to and communicate with a single second electrical connector of the other of the module and the hand-held base unit.

3. The controller of claim 2, wherein the two or more first electrical connectors are associated with the at least one module-receiving feature of the hand-held base unit.

4. The controller of claim 3, wherein the module-receiving feature of the hand-held base unit comprises a recess in the hand-held base unit.

5. The controller of claim 4, wherein the two or more first electrical connectors are offset by substantially equal distances from an orientation center of the recess.

6. The controller of claim 1, wherein at least one of the two or more module actuators comprises a direction controller.

7. The controller of claim 6, wherein at least two of the two or more module actuators comprise direction controllers.

8. The controller of claim 7, wherein one of the directional controllers comprises a directional pad and another of the direction controllers comprises a stick.

9. The controller of claim 1, wherein the at least one base unit actuator comprises a direction controller.

10. The controller of claim 1, wherein the at least one base unit actuator is configured to be operated by a thumb of one hand of the user and, for each orientation of the module, at least one of the two or more module actuators is configured to be operated by a thumb of another hand of the user.

11. The controller of claim 1, wherein the at least one base unit actuator is positioned relative to a pair of hand grips so as to enable the at least one base unit actuator to be operated by a thumb of one hand of the user and, for each orientation of the module, the at least one module actuator of the two or more module actuators is positioned relative to the hand grips so as to enable the at least one module actuator to be operated by a thumb of another hand of the user.

12. The controller of claim 1, wherein the module is configured to be removably mounted to the hand-held base unit and to be rotated horizontally between the two or more orientations to modify the configuration of the two or more module actuators relative to the at least one base unit actuator.

13. The controller of claim 1, wherein the module-receiving feature of the base unit comprises a recess in the base unit.

14. The controller of claim 13, wherein the recess defines a plurality of discrete orientations for the module and the two or more module actuators relative to the base unit.

15. A method of operating a video game controller, comprising:
providing a hand-held video game controller with a module collectively carrying a plurality of module actuators coupled in a first orientation relative to a base unit of the video game controller, wherein in the first orientation a first electrical connector of the module is in electrical communication with a first electrical connector of a receiving portion of the base unit and a second electrical connector of the module is in electrical communication with a second electrical connector of the receiving portion of the base unit;
disengaging the module from the receiving portion of the base unit;
rotating the module from the first orientation to a different, second orientation relative to the base unit to change an orientation of the plurality of module actuators relative to the base unit and the receiving portion of the base unit; and
recoupling the module to the same receiving portion of the base unit in the second orientation, including reestablishing electrical communication between the plurality of module actuators and the base unit such that the first electrical connector of the module is in electrical connection with the second electrical connector of the receiving portion of the base unit and the second electrical connector of the module is in electrical communication with the first electrical connector of the receiving portion of the base unit.

16. A video game controller comprising:
a hand-held base unit comprising at least one base unit actuator configured to generate an actuation signal in response to user input; and
a module comprising two or more module actuators and two or more electrical connectors on a single body, each module actuator configured to generate a respective actuation signal in response to user input and convey the actuation signal to at least one respective electrical connector;
wherein the module is removably mounted at least partially within an opening defined by the base unit, the module being configured to be rotated between two or more orientations in which the module is at least partially within the opening to change a configuration of the two or more module actuators and the two or more electrical connectors relative to the at least one base unit actuator.

17. The method of claim 16, further comprising:
generating actuation signals with the at least one base unit actuator and at least two of the module actuators with the module in the second orientation.

18. The method of claim 17, further comprising:
generating actuation signals with the at least one base unit actuator and at least two of the module actuators with the module in the first orientation, before disengaging the module from the base unit.

19. The video game controller of claim 16, wherein:
the hand-held base unit includes at least one module receiving feature defining an opening;
the module includes a module body that is selectively mountable relative to the at least one module receiving feature and at least partially within the opening;
the two or more module actuators are configured to be collectively carried by the module body when the module is in each of the two or more orientations and when the module body is removed from the module receiving feature; and
each of the two or more module actuators are mounted relative to the same one of the at least one module receiving feature and relative to the opening in each of the two or more orientations, such that in the at least two orientations, the module body is at least partially within the same opening.

20. The video game controller of claim 19, wherein in a second of the at least two orientations, the module body is rotated about a central axis about one-hundred eighty degrees relative to a position of the module body in a first orientation of the at least two orientations.

* * * * *